United States Patent Office

3,533,861
Patented Oct. 13, 1970

3,533,861
METHOD OF IMPROVING THE MAGNETOSTRICTION AND CORE LOSS OF CUBE-ON-FACE ORIENTED MAGNETIC STEELS
Karl Foster and Joseph Seidel, Pittsburgh, Pa., assignors to Westinghouse Electric Corporation, Pittsburgh, Pa., a corporation of Pennsylvania
No Drawing. Continuation-in-part of application Ser. No. 576,963, Sept. 2, 1966, which is a continuation-in-part of application Ser. No. 556,337, June 9, 1966. This application Apr. 10, 1968, Ser. No. 720,333
Int. Cl. H01f 1/18, 27/24; B32b 15/00
U.S. Cl. 148—113
11 Claims

ABSTRACT OF THE DISCLOSURE

The method is set forth for improving the magnetostriction and core loss of cube-on-face oriented silicon steels. A glass coating is fused to the steel while the same is under tension. Data is included illustrating magnetostriction, core loss and other magnetic data.

CROSS REFERENCE TO RELATED APPLICATION

This invention is a continuation-in-part of our copending application Ser. No. 576,963, filed Sept. 2, 1966 in the names of Karl Foster and Joseph Seidel and entitled Glass Coated Electrical Steel Sheet and Articles Prepared Therefrom, which is a continuation-in-part of application Ser. No. 556,337, filed June 9, 1966 in the names of Karl Foster and Joseph Seidel, now abandoned.

BACKGROUND OF THE INVENTION

In our copending application above referred to it was shown that the application of glass alone to the cube-on-edge oriented silicon steels resulted in very low magnetostriction values in the rolling direction. However, when the same glasses were applied to silicon steel characterized by the cube-on-face orientation, values as low as those for cube-on-edge oriented silicon steels were not obtained, although some reduction in magnetostriction was observed.

Part of the reluctance to the commercial acceptance of cube-on-face material resides in the fact that the core loss exhibited by the cube-on-face steels was at a higher level than that for cube-on-edge materials although the so-called "corner loss" in a power transformer application was considerably less because of the bilateral orientation. Moreover, as a class, the cube-on-face materials exhibit a significantly higher magnetostriction than that of cube-on-edge materials.

It has been postulated that the difference in response of the magnetostriction properties to the glass coating of cube-on-edge oriented silicon steel and cube-on-face oriented silicon steels is a result of variation of the mechanical properties with respect to the orientation of each class of materials. For example, Young's modulus for silicon iron is much lower in the [100] direction than in either the [110] or [111] directions. In cube-on-edge oriented silicon steels which has only one [100] direction, that is in the direction of rolling, there results a significant tensile strain only in the direction of rolling when a glass having a low thermal expansion is applied, thereby resultig in a large effect on the magnetostriction in this particular direction. On the other hand, cube-on-face oriented silicon steel ideally has two directions of easiest magnetization, one being in the rolling direction and the other being in the same plane but perpendicular to the rolling direction. As a result, the application of glass to cube-on-face oriented silicon steels must then tend to create an equal tensile strain in both directions. However, the strain cannot be as large in any one direction as that for cube-on-edge oriented silicon steel in the rolling direction, nor the effect on the magnetostriction so pronounced. Consequently, an additional means must be used in order to obtain very low magnetostriction in one direction in cube-on-face oriented materials. Preferably, this direction is the rolling direction.

SUMMARY OF THE INVENTION

The present invention utilizes a cube-on-face oriented silicon steel containing up to 5% silicon, and preferably from about 2% to about 4% silicon, and other minor components as will be set forth hereinafter. The steel is first treated to produce an adherent coating on the surface thereof since in the production of cube-on-face oriented silicon steel, the surfaces are clean to the extent of being completely oxide free, resulting from the last anneal which develops the cube-on-face orientation. The steel is thereafter subjected to the application of a glass coating thereto which coating has a characteristic low coefficient of thermal expansion, which coefficient must be lower than that of the steel. Thereafter the coating is fused and during such fusion the steel is subjected to a predetermined amount of tension preferably in the rolling direction. Upon fusion of the glass coating the steel is permitted to cool to a temperature below the softening point of the glass while maintaining the steel in tension.

The above process is effective for producing low values of magnetostriction preferably in the rolling direction which is accomplished with a corresponding improvement in the core loss exhibited by the silicon steel.

It is an object of the present invention to provide a process for improving the magnetostriction of silicon steel characterized by cube-on-face orientation.

It is another object of the present invention to provide a process for applying glass to the surface of cube-on-face oriented silicon steel for improving the magnetostriction and the core loss exhibited by the silicon steel.

Other objects of the present invention will become apparent to those skilled in the art when taken in conjunction with the following description.

DESCRIPTION OF THE PREFERRED EMBODIMENT

The steel to which the process of the present invention is applicable is a silicon iron which is characterized by a silicon content of up to about 6% and preferably between about 2% and 4% silicon, and small amounts of up to 4% of chromium, up to 0.4% manganese, up to 1% nickel, and up to 0.2% molybdenum. Outstanding results have been obtained where the silicon content was maintained glass to the intermediate layer formed on the silicon steel. has been treated in such a way as to produce an orientation which is known as cube-on-face. Thus, there are two directions of easy magnetization, one in the rolling direction and the other in the plane of rolling direction perpendicular to the rolling direction. Since in the production of such cube-on-face oriented steel they emerge from their last anneal with a clean surface, it becomes incumbent to provide an intermediate layer well bonded to the surface of the silicon steel for the proper adherence of the glass thereto. This may be accomplished in a number of ways. One expedient is to anneal the cube-on-face oriented materials at a temperature of about 1200° C. in the presence of MgO which is preferably applied to the steel in the form of a thin slurry or aqueous suspension coating. Such anneal is preferably performed employing a hydrogen atmosphere. The intermediate layer so formed comprising a well bonded ferrous magnesium silicate provides adherence of the glass to the steel and is more clearly described in our copending application referred to hereinbefore. Alternatively, this intermediate layer may be formed in any number of ways and contains any number of components, examples of which are nickel plating, vapor deposited aluminum or a heat reacted magnesium phosphate slurry. It is sufficient so that the intermediate layer provides for good adherence of the glass to the layer and said intermediate layer of course must be integrally bonded to the silicon steel. Ordinarily, such intermediate layer is of a thickness of the order of 0.05 to 0.3 mil.

With the properly prepared surface of the silicon steel there is applied thereto a glass frit which is characterized by possessing a thermal expansion of less than that of the steel and outstanding results have been obtained where the glass exhibits a coefficient of thermal expansion of less than about $8 \times 10^{-6}$ in./in. ° C. In addition it is also preferred to have a glass which will have a fusion point of not greater than about 950°. The glass frit is applied to the steel in any convenient manner, for example, by dipping or roll coating. While the thickness is not critical nonetheless it is desired to maintain the thickness of the glass coating as small as possible in order to obtain the highest space factor. The thinness of this coating will prevent undue flaking or spalling in the event of reasonable bending or flexure of the silicon steel after the glass has been fused. Typically, the thickness of about 0.1 to about 0.3 mil per side is desired. Next, the steel with the glass frit in place is fired preferably at a temperature not in excess of 950° C. During this firing, the glass frit will react to fuse and to provide a tightly adherent layer of glass to the intermediate layer formed on the silicon steel. During such fusion or while the temperature of this firing is maintained above the softening point of the glass, the steel must be subjected to a tensile stress of at least 50 p.s.i. and up to about 2000 p.s.i. This stressing is done preferably in the rolling direction in order to apply additional stresses thereto as will be more fully explained hereinafter.

As will appear more clearly hereinafter, any amount of stress will improve the magnetostriction and the core loss exhibited by the steel. However, it will be appreciated that when the steel is heated to a temperature near 950° C. the maximum stress which can be safely applied to the steel is about 350 p.s.i. The application of higher stress will cause plastic deformation which may partially or completely destroy the cube-on-face orientation. Consequently, the applied stress should decrease with corresponding increases of temperatures above the softening point of the glass. Where, however, the glass is fired near its softening point it may be advantageous to apply as much as 2000 p.s.i. stress in order to obtain the advantages of this invention.

Further, it is preferred to vary the stress to be applied to the steel in accordance with the permeability of the steel. More specifically, it has been found that as the permeability of the steel increases the given stress for a given temperature should also increase. Thus, for a low permeability steel stressed 350 p.s.i. in the rolling direction it will require a higher stress in the rolling direction at the same temperature for a steel exhibiting a higher permeability in order to obtain the same degree of improvement in magnetostriction and core loss. This is believed to be partially explained by reason of the fact that the higher permeability is associated with a greater degree of orientation. After the glass has fused and while the steel is maintained in the stressed condition it is cooled until the temperature of this steel and glass drops below the softening point of the glass, usually about 400° C. is a safe temperature for most usable glasses. During this time the stresses are maintained and are only discontinued when a convenient temperature is obtained below the softening point of the glass. The process of the present invention is adaptable for both batch as well as continuous type operations.

EXAMPLE I

A 3% silicon steel having over 90% of its volume with the (100) plane within 10° of the sheet direction but with only about 50% of its volume with a [100] direction within 10% of the rolling direction exhibited an induction at 10 oersteds of about 17,300 gausses. This steel, referred to as a low permeability steel, was annealed at 1200° C. in a hydrogen atmosphere with a thin aqueous MgO coating applied to the steel to form an intermediate ferrous magnesium silicate layer less than 0.1 mil thick thereon for adherence of the glass. Thereafter a glass frit was applied to the steel and this glass frit has a thickness of about 0.25 mil per side. The glass, identified as LM103 had a composition which included 38.0% PbO, 27.0% $SiO_2$, 10.0% $Na_2O$, 9.5% $B_2O_3$, 6.0% MgO, 3.5% BaO, 2.0% $K_2O$, 2.0% $Li_2O$ and 1.0% CaO. Its coefficient of expansion is about $13 \times 10^{-6}$ in./in. ° C. The glass coating was first fired without stress at a temperature between 750° and 800° C. The samples were then reheated to between 500 and 550° C. which is above the softening temperature of the glass and cooled under variously applied tensile loads.

Reference is directed to Table I which illustrates the magnetic test results for the materials under the conditions stated.

TABLE I.—MAGNETIC PROPERTIES

| Glass | Stress (p.s.i.) | $H_c$ (oe.) | $B_r$ (gauss) | $B_{10}$ (gauss) | Core Losses | | Magnetostriction ($\times 10^6$) | | |
|---|---|---|---|---|---|---|---|---|---|
| | | | | | Pc 15/60 (w./lb.) | Pc 17/60 (w./lb.) | 15 kg. | 17.5 kg. | 20 kg. |
| None | | .070 | 10,000 | 17,300 | .81 | 1.21 | 12.3 | 20.3 | 21.9 |
| LM103 | | .059 | 11,400 | 17,500 | .78 | 1.17 | 12.6 | 14.8 | 14.3 |
| LM103 | 350 | .058 | 11,600 | 17,300 | .75 | 1.09 | 7.7 | 9.8 | 11.2 |
| LM103 | 700 | .057 | 10,700 | 16,800 | .78 | 1.19 | 5.0 | 7.7 | 13.3 |

It is noted from Table I that without glass the material exhibited a core loss of .81 watt per pound and at 15 kg. a magnetostriction of $12.3 \times 10^{-6}$. Merely applying the glass to the strip did not in and of itself produce any sufficient difference in the magnetostriction nor in the core loss properties. However, when the steel was subjected to the conditions of stress set forth, that is 350 p.s.i. and 700 p.s.i. while above the softening temperature of the glass, and the material was cooled under those conditions of stress while being cooled until the softening point of the glass was passed, it is noted that while there is great improvement in the magnetostriction exhibited by the steel resulting from the application of stress, nonetheless the level of these values are considered to be clearly high. Table I also records a slight improvement in core loss. It is believed that such modest improvements arose since the glass employed, that is LM103, had a coefficient of thermal expansion which rather closely matched that of the steel, and no additional tensile stresses were imparted to the steel resulting from the fusion of the glass and the cooling to room temperature. Consequently, when the glass has a coefficient of thermal expansion closely approximating that of the steel there will appear some improvement in magnetostriction and core loss but the degree of improvement is small in comparison to that exhibited by the steel when a glass is employed having a coefficient of less than about $8.0 \times 10^{-6}$.

EXAMPLE II

The same steel as set forth in Example I was coated with a glass identified as PH115. This glass had a composition of 66.0% $P_2O_5$, 12.0% MnO, 10.5% $Al_2O_3$, 5.5% ZnO, 2.75% $SiO_2$, 1.5% $Na_2O$, 0.75% CaO, 0.5% $As_2O_3$, and 0.5% $V_2O_5$ and a coefficient of thermal expansion of $7.2 \times 10^{-6}$ in./in. ° C. As a result of the difference in the coefficient of thermal expansion between the steel and the glass substantial tensile stresses are imparted to the coated sheet upon cooling to room temperature. The steel having a coating thickness of about 0.5 mil total was fired at a temperature of 750 and 800° C. to fuse the glass. The samples were reheated to between 500 and 550° C., which exceeded the softening point of the glass, and cooled under the applied tensile loads as set forth hereinafter in Table II.

From Table III it is clear that the trend which was established in Table II with respect to a low permeability silicon steel having a cube-on-face orientation was carried through with even better results, into a silicon steel having a cube-on-face orientation and exhibiting a very high permeability. As demonstrated hereinbefore, the mere application of the glass having a controlled coefficient of thermal expansion was sufficient for showing some improvement in the magnetostriction and some improvement in the core loss properties without significantly decreasing the balance of the magnetic characteristics.

TABLE II.—MAGNETIC PROPERTIES

| Glass | Stress (p.s.i.) | $H_c$ (oe.) | $B_r$ (gauss) | $B_{10}$ (gauss) | Core Losses | | Magnetostriction ($\times 10^6$) | | |
|---|---|---|---|---|---|---|---|---|---|
| | | | | | Pc 15/60 (w./lb.) | Pc 17/60 (w./lb.) | 15 kg. | 17.5 kg. | 20 kg. |
| None | | .070 | 10,000 | 17,300 | .81 | 1.21 | 12.3 | | |
| PH115 | | .079 | 9,100 | 17,200 | .82 | 1.28 | 3.3 | 5.9 | 7.9 |
| PH115 | 350 | .062 | 10,500 | 17,600 | .75 | 1.07 | −2.4 | −2.4 | −3.5 |
| PH115 | 700 | .063 | 9,400 | 17,300 | .75 | 1.10 | −1.0 | −0.6 | 1.1 |

From the test results set forth in Table II it is apparent that the mere application of the glass to the steel alone produces a significant decrease in the magnetostriction. This was expected because of the significantly lower coefficient of thermal expansion exhibited by the glass PH115 in comparison with steel. Where, however, the steel was subjected to the tensile load of 350 p.s.i. and 700 p.s.i., it is noted that a further greatly pronounced, decrease in the magnetostriction is obtained. The improvement in the magnetostriction is also accompanied by an improvement in the core loss exhibited by these materials. While the change in the remanence characteristics are not significant, the coercive force and induction at $B_{10}$ do not deteriorate. Thus the application of the stress together with the selection of the proper glass provides for outstanding improvement in magnetostriction properties as well as reduced core losses without significant deterioration in the balance of the magnetic characteristic.

EXAMPLE III

Another cube-on-face oriented 3½% silicon steel was selected and this steel exhibited over 80% of its volume being cube-on-face grains having cube edges with the [100] direction within 10° of the rolling direction. Consequently, this steel, which had an induction of about 18,600 gausses at 10 oersteds, is referred to as a high permeability steel. This steel was annealed at 1200° C. in a hydrogen atmosphere and the surfaces were coated with a thin layer of an aqueous MgO slurry to provide a thin intermediate layer for adherence of the glass, the same as in Examples I and II. Thereafter, a coating of glass PH115 to a total thickness of 0.5 mil was again applied to this steel which was first fired without stress at a temperature between 750 and 800° C. Thereafter the samples were reheated to a temperature within the range between 500 and 550° C. and a load applied as set forth hereinafter. The steel was cooled to a temperature below the softening point of the glass while maintaining the tensile stress in the rolling direction as set forth more clearly hereinafter in Table III.

However when the steel was cooled under an applied load of 350 pounds per square inch until the softening point of the glass was surpassed, a more significant improvement both in the magnetostriction and in the core losses is exhibited by the steel as processed in accordance with the teachings of this invention.

From the foregoing it has been clearly demonstrated that a number of criteria must be employed in order to produce the outstanding results as demonstrated hereinbefore. These criteria include the selection of the glass having a sufficiently low coefficient of thermal expansion and preferably a coefficient of thermal expansion of less than $8 \times 10^{-6}$ in./in. ° C. In addition thereto it is also necessary to maintain the steel under stress during cooling from the glass fusion temperature until the steel reaches a temperature below the softening point of the glass. During this time the load to be applied should be a load above 50 p.s.i. and preferably between about 350 p.s.i. and 2000 p.s.i.

Care must be exercised however so as not to apply too great a load for it is possible to induce sufficient strain and/or creep to the steel so as to deteriorate the observable magnetic characteristics. Accordingly, it is believed that about 2000 pounds per square inch at the elevated temperature should be about the upper level to which the steel is stressed. The steel stressed to less than about 350 p.s.i. at temperatures approaching the softening point of the glass did not appear to significantly change the magnetostriction over that produced by applying to the steel a glass having the proper coefficient of thermal expansion to thereby induce the tensile stresses as a result of the differences in the coefficient of thermal expansion between that exhibited by the glass and that exhibited by the steel. However, these lower stresses are effective where the softening point of the glass is quite high.

Characteristically, while a glass of the phosphate type has proved to be effective, other glasses can be employed so long as they produce a coefficient of thermal expansion of about less than $8 \times 10^{-6}$ in./in. ° C. Success has been

TABLE II.—MAGNETIC PROPERTIES

| Glass | Stress (p.s.i.) | $H_c$ (oe.) | $B_r$ (gauss) | $B_{10}$ (gauss) | Core Losses | | Magnetostriction ($\times 10^6$) | | |
|---|---|---|---|---|---|---|---|---|---|
| | | | | | Pc 15/60 (w./lb.) | Pc 17/60 (w./lb.) | 15 kg. | 17.5 kg. | 20 kg. |
| None | | .077 | 6,300 | 18,900 | .79 | .96 | 22.1 | 26.3 | 31.5 |
| PH115 | | .065 | 10,700 | 18,600 | .67 | .88 | 9.1 | 12.8 | 16.2 |
| PH115 | 350 | .062 | 9,700 | 18,600 | .64 | .85 | 1.2 | 2.2 | 5.9 | had with glasses having the following range of compositions.

| Constituent: | Glass A, weight percent | Glass B, weight percent |
|---|---|---|
| $P_2O_5$ | 60–70 | |
| MnO | 10–14 | |
| $Al_2O_3$ | 9–12 | (1) |
| ZnO | 4–7 | 31–60 |
| $SiO_2$ | 1.5–3.5 | 8–14 |
| $Na_2O$ | 0–2 | |
| CaO | 0–1 | |
| $As_2O_3$ | 0–1 | |
| $V_2O_5$ | 0–1 | |
| PbO | | 10–44 |
| $B_2O_3$ | | 11–22 |

¹ Principally balance.

With the glass having a thermal expansion of less than about $8 \times 10^{-6}$ in./in. °C., the glass should also exhibit a fusion point of less than about 950° C. This is desirable since use of glasses melting at higher temperatures may produce difficulties through excessive oxidation or they detrimentally affect the magnetic characteristics exhibited by the steel. Consequently, it is desired to provide the glass frit with a fusion temperature not in excess of 950° C. and preferably one between 750 and 800° C.

It should be noted that in each of the foregoing examples the glass frit was first fused and thereafter reheated and cooled under the applied tensile loads. It is apparent that the process may be carried out in a single heating step, wherein the steel is subjected to the tension during the fusion and cooled directly therefrom without the necessity for any reheating. It is clearly contemplated that when the steel is processed on a continuous basis the frit will be applied to the silicon steel and fired at a sufficiently high temperature to fuse the glass and the cooling below the softening point of the glass will take place while the strip is maintained under a continuous tensile load within the limits set forth hereinbefore.

Thus the continuous strip can be passed into a long vertical furnace having a heating section at the bottom while the cooling takes place in the upper part, the strip being under a suitable tension between upper and lower rolls at the upper and lower ends of the furnace with the weight of the strip applying a higher load on the cooling portion of the strip than is present in the lower portion of the vertical furnace where the glass is being fused. Thus in a 100 foot vertical length, the load at the upper end is about 300 p.s.i. due to the weight of the strip above.

It will be understood by those skilled in the art that although the invention has been described in connection with preferred embodiments, modification and variations in the processing schedule and in other aspects of the invention may be employed without departing from the underlying spirit and scope of the invention set forth in the appended claims.

We claim as our invention:

1. In the method of improving the magnetostriction and core loss of cube-on-face oriented steels containing up to about 5% silicon, comprising up to 4% chromium, up to 0.4% manganese, up to 1% nickel and up to 0.2% molybdenum, the balance being iron and impurities, in which the steel is first treated to produce a thin adherent coating on the surface thereof, the improvement comprising, applying a glass coating to the surface of the treated steel, said glass coating having a coefficient of thermal expansion lower than that of the steel, firing said coating, subjecting the steel to a predetermined amount of tension in the rolling direction while the glass coating on the steel is above its softening point and cooling the glass coating below the softening point of the glass while maintaining said steel in tension.

2. The method of claim 1 in which the glass exhibits a coefficient of expansion of less than $8 \times 10^{-6}$ in./in.° C.

3. The method of claim 1 in which the steel is subjected ot a stress of between 350 and 2000 pounds per square inch during cooling of the glass to below the softening point thereof.

4. The method of claim 1 in which the glass has a composition of:

| Constituent: | Weight percent |
|---|---|
| $P_2O_5$ | 60–70 |
| MnO | 10–14 |
| $Al_2O_3$ | 9–12 |
| ZnO | 4–7 |
| $SiO_2$ | 1.5–3.5 |
| $Na_2O$ | 0–2 |
| CaO | 0–1 |
| $As_2O_3$ | 0–1 |
| $V_2O_5$ | 0–1 |

5. The method of claim 1 in which the glass has a composition of:

| Constitutent: | Weight percent |
|---|---|
| ZnO | 31–60 |
| $SiO_2$ | 8–14 |
| PbO | 10–44 |
| $B_2O_3$ | 11–22 |
| $Al_2O_3$ | Principally balance |

6. The method of claim 1 in which the glass exhibits a fusion temperature of less than about 950° C.

7. The method of claim 1 in which the stress applied to the steel varies inversely with the temperature to which the steel is heated.

8. The method of claim 1 in which the stress applied to the steel at a given temperature above the softening point of the glass varies directly with the permeability of the steel.

9. In the process for improving the magnetostriction in the rolling direction and the core loss of cube-on-face oriented silicon steels containing from about 2% to about 4% silicon by applying a glass coating thereto and in which the steel has been subjected to the formation of a thin intermediate layer for the adherence of glass thereto, the steps comprising, applying a glass coating to the steel which coating is characterized by a fusion temperature of less than about 950° C. and a coefficient of thermal expansion of less than $8 \times 10^{-6}$ in./in.° C., firing said glass coating to fuse the same to the intermediate layer on the steel, subjecting said steel to a tensile stress of up to 2000 p.s.i. in the rolling direction and cooling said steel while maintaining said steel under tension until the temperature of the glass is below the softening point.

10. The process of claim 9 in which the applied tensile stress is varied inversely within the range of up to 2000 p.s.i. with the temperature to which the steel is heated above the softening point of the glass.

11. The process of claim 9 in which the applied tensile stress is varied directly within the range of up to 2000 p.s.i. with the permeability exhibited by the steel.

References Cited

UNITED STATES PATENTS

| | | | |
|---|---|---|---|
| 2,501,349 | 3/1950 | Nagel et al. | 336—219 X |
| 2,920,296 | 1/1960 | Neurath. | |
| 3,088,835 | 5/1963 | Pirooz | 106—53 |
| 3,106,496 | 10/1963 | Anolick | 148—6 X |
| 3,144,364 | 8/1964 | Robinson et al. | 148—113 |
| 3,200,310 | 8/1965 | Carman | 106—54 |
| 3,375,144 | 3/1968 | Taylor | 148—113 |
| 3,407,091 | 10/1968 | Busdiecker | 106—47 X |
| 3,418,710 | 12/1968 | Seidel et al. | 117—129 X |

L. DEWAYNE RUTLEDGE, Primary Examiner

G. K. WHITE, Assistant Examiner

U.S. Cl. X.R.

106—47, 53; 117—129; 148—31.5, 31.55; 336—219